US012649122B2

(12) United States Patent
Nan et al.

(10) Patent No.: US 12,649,122 B2
(45) Date of Patent: Jun. 9, 2026

(54) HIGH-TEMPERATURE STEAM-WATER FILTERING UNIT AND COMBINED HIGH-TEMPERATURE STEAM-WATER FILTERING DEVICE

(71) Applicant: Hangzhou Wandess Environmental Protection Technology Co., Ltd., Hangzhou (CN)

(72) Inventors: Lizhi Nan, Hangzhou (CN); Zhaohua Li, Hangzhou (CN); Jianhua Rong, Hangzhou (CN); Naipu Xie, Hangzhou (CN); Kai Ji, Hangzhou (CN)

(73) Assignee: Hangzhou Wandess Environmental Protection Technology Co., Ltd., Hangzhou (CN)

( * ) Notice: Subject to any disclaimer, the term of this patent is extended or adjusted under 35 U.S.C. 154(b) by 794 days.

(21) Appl. No.: 17/925,723

(22) PCT Filed: Mar. 29, 2021

(86) PCT No.: PCT/CN2021/083659
§ 371 (c)(1),
(2) Date: Nov. 16, 2022

(87) PCT Pub. No.: WO2021/238384
PCT Pub. Date: Dec. 2, 2021

(65) Prior Publication Data
US 2023/0191304 A1 Jun. 22, 2023

(30) Foreign Application Priority Data

May 26, 2020 (CN) .......................... 202010454011.2
May 26, 2020 (CN) .......................... 202020913284.4

(51) Int. Cl.
B01D 46/12 (2022.01)
B01D 46/24 (2006.01)
B01D 46/58 (2022.01)

(52) U.S. Cl.
CPC .......... B01D 46/12 (2013.01); B01D 46/2411 (2013.01); B01D 46/58 (2022.01)

(58) Field of Classification Search
CPC ............................ B01D 46/12; B01D 46/2411
See application file for complete search history.

(56) References Cited

U.S. PATENT DOCUMENTS

2013/0168303 A1* 7/2013 Appling .............. A61M 1/3615
210/232

FOREIGN PATENT DOCUMENTS

CN 101091848 A 12/2007
CN 203916340 U 11/2014
(Continued)

OTHER PUBLICATIONS

CN-205346885-U_English Translation (Year: 2016).*
CN-208302334-U_English Translation (Year: 2019).*

*Primary Examiner* — Youngsul Jeong
(74) *Attorney, Agent, or Firm* — MUNCY, GEISSLER, OLDS & LOWE, P.C.

(57) ABSTRACT

The present invention discloses a high-temperature steam-water filtering unit, which comprises: a filter frame divided into an upper layer and a lower layer by an interlayer, the lower layer being provided with a feed inlet, and the upper layer being provided with a discharge port; a filter comprising a plurality of filter cartridges mounted on the interlayer along a vertical direction, an inlet of each filter cartridge being positioned below the interlayer, and an outlet of each filter cartridge being positioned above the interlayer; and a communicating channel being in communication with the discharge port. The present invention also discloses a com- (Continued)

bined high-temperature steam-water filtering device, which comprises: two or more filtering units arranged in an outer shell and communicating channels extending along a vertical height direction of filter frames and being in communication with discharge ports and feed inlets of the adjacent filtering units. In the present invention, filters and a filter frame which are spliced and combined are combined into a filtering unit, and the filtering units can be freely combined according to the requirements of filtering precision, filtering flow, pressure reduction and the like.

4 Claims, 9 Drawing Sheets

(56) References Cited

FOREIGN PATENT DOCUMENTS

| CN | 205346885 U | * | 6/2016 | ................ C02F 1/28 |
|----|-------------|---|--------|---------------------------|
| CN | 208302334 U | * | 1/2019 | ............. B01D 35/02 |
| CN | 212548678 U |   | 2/2021 | |
| WO | WO-9103689 A1 | * | 3/1991 | .............. F24F 13/28 |

* cited by examiner

HIGH-TEMPERATURE STEAM-WATER FILTERING UNIT AND COMBINED HIGH-TEMPERATURE STEAM-WATER FILTERING DEVICE

TECHNICAL FIELD

The present invention belongs to the technical field of steam purification treatment, and particularly relates to a high-temperature steam-water filtering unit and a combined high-temperature steam-water filtering device.

BACKGROUND

During the operation of the boiler, a large amount of high-temperature and high-salinity wastewater is generated and can be discharged after being desalted. The traditional high-salinity wastewater treatment method is relatively complex and high in cost. Since the wastewater has the characteristics of high temperature and high pressure, the wastewater is subjected to flash evaporation and mixing by using saturated steam of a boiler, so that the wastewater is gasified instantly, and then salts which cannot be evaporated in the wastewater are removed through adsorption and filtration. In order to make the treated high-temperature "mixed steam" be continuously supplied to equipment such as a steam turbine or other high-grade heat users for use, the steam needs to be further purified to meet the requirements of the heat users.

Chinese Patent CN 101091848 discloses a combined filter vat, which is characterized in that a plurality of filter screen drums are arranged in a vat body, a liquid inlet groove is used for conveying a filtrate to be filtered to each filter screen drum, and the filtrate flows out from a liquid outlet pipe at the lower part of the vat body after being filtered by the filter screen drums. The whole volume is too large to adapt to mounting sites with different shapes.

SUMMARY

In order to overcome the defects of the prior art, the present invention provides a high-temperature steam-water filtering unit and a combined high-temperature steam-water filtering device which have an advantage that the filtering device is decomposed into a plurality of combined filtering units, such that the filtering device can adapt to different mounting sites, the length design of a filtering path can be performed according to the actual properties of a medium to be filtered, the adjustment is simple and convenient, the filtering efficiency is high, and the filtering effect is good.

The technical solution adopted by the present invention for solving the technical problem is as follows: a high-temperature steam-water filtering unit is provided, comprising:
   a filter frame divided into an upper layer and a lower layer by an interlayer, the lower layer being provided with a feed inlet, and the upper layer being provided with a discharge port;
   a filter comprising a plurality of filter cartridges mounted on the interlayer along a vertical direction, an inlet of each filter cartridge being positioned below the interlayer, and an outlet of each filter cartridge being positioned above the interlayer; and
   a communicating channel being in communication with the discharge port.
   Preferably, the interlayer is provided with two or more of the filters.

Preferably, a drain outlet is arranged at the bottom of the filter frame.

Preferably, the filter comprises a flange bottom plate, and the filter cartridges are vertically mounted on the flange bottom plate; access manholes with a same number as the filters are formed in the filter frame.

The present invention also discloses a combined high-temperature steam-water filtering device, which comprises:
   two or more filtering units arranged in an outer shell, wherein each filtering unit comprises:
   a filter frame divided into an upper layer and a lower layer by an interlayer, the lower layer being provided with a feed inlet capable of being in communication with a steam inlet, and the upper layer being provided with a discharge port;
   a filter comprising a plurality of filter cartridges mounted on the interlayer along a vertical direction, an inlet of each filter cartridge being positioned below the interlayer, and an outlet of each filter cartridge being positioned above the interlayer; and
   a communicating channel extending along a vertical height direction of the filter frame and being in communication with the discharge port and the feed inlet of the adjacent filtering units.
   Furthermore, the interlayer is provided with two or more of the filters, the two or more of the filters being arranged along a direction perpendicular to a medium flowing direction. The two or more of the filters are arranged in parallel on the same interlayer, so as to increase the flow rate of each filtering unit.

Furthermore, the feed inlet and the discharge port of each filtering unit are oppositely arranged; or the feed inlet and the discharge port of each filtering unit are arranged in a staggered manner.

Furthermore, the discharge port of the filtering unit at a tail end is in communication with a steam outlet; or the steam outlet is arranged at a top of the communicating channel at a tail end.

Furthermore, the filtering unit also comprises a pressure sensor for monitoring a differential pressure between the feed inlet and the discharge port.

Furthermore, a drain outlet is arranged at the bottom of the filter frame; access manholes with a same number as the filters are formed in the filter frame; the filter comprises a flange bottom plate, and the filter cartridges are mounted on the flange bottom plate in parallel.

In the present invention, the impurities, inorganic salts and other harmful substances in the steam or the steam-water mixture are removed by filtration and adsorption, thereby improving the steam grade; the present invention can be used independently or used with a high-temperature wastewater desalination device, the mixed steam output by the device and subjected to primary treatment is received, and then is subjected to further fine filtration to improve the grade of the mixed steam, and thus can be supplied to heat users with higher requirements on the grade of the steam, such as steam turbines, and printing and dyeing enterprises.

The present invention utilizes multi-stage combined filtering units, and can form various filtering devices connected in series and in parallel by utilizing flexible filtering unit combinations according to the requirements of users on steam grade, various different filtering precision requirements, combined filtering flow, pressure and other parameters. Various filter screens are arranged from coarse to fine so as to realize multi-stage filtration of steam and remove impurities, inorganic salts and other harmful substances in the steam or the steam-water mixture.

The beneficial effects of the present invention are as follows: filters and a filter frame which are spliced and combined are combined into a filtering unit, the filter frame is a cube or a cylinder and is divided into an upper layer and a lower layer, and the filters are mounted between the upper layer and the lower layer; a medium enters into the lower part of the filtering unit and exits out from the upper part of the filtering unit, and the inlet and the outlet can be randomly selected in four directions; the filtering units can be freely combined according to the requirements of filtering precision, filtering flow, pressure reduction and the like, and can be combined in parallel or in series into single-stage or multi-stage filtering, so that the use mode is more flexible; a cleaning access hole (manhole) is formed in the upper part of each filtering unit, and each filtering unit and the metal filters can be backwashed or replaced through the manhole; the medium flows from bottom to top when passing through the filters, so that impurities are deposited at the bottom of the filter frame conveniently.

DETAILED DESCRIPTION

In order to make those skilled in the art better understand the solution of the present invention, the technical solutions in the embodiments of the present utility model will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skill in the art without creative effort shall fall within the protection scope of the present invention.

As shown in FIGS. 1-6, a high-temperature steam-water filtering unit is shown, comprising a filter frame 2, a filter 4 mounted on the filter frame 2, and a communicating channel 5.

Figures 1, 2:
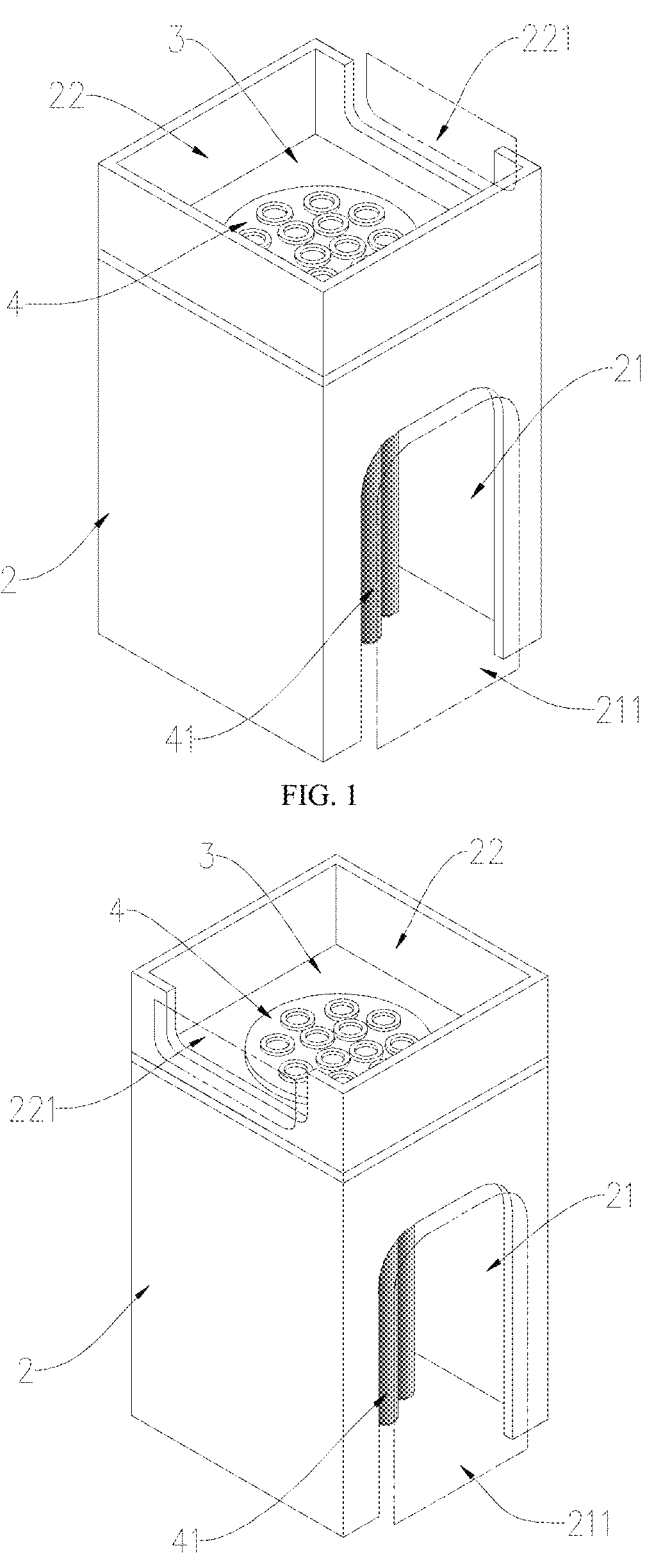
FIG. 1 is a first schematic structural diagram of a filter frame and a filter in a high-temperature steam-water filtering unit according to the present invention.
FIG. 2 is a second schematic structural diagram of the filter frame and the filter in the high-temperature steam-water filtering unit according to the present invention.
Figure 3:
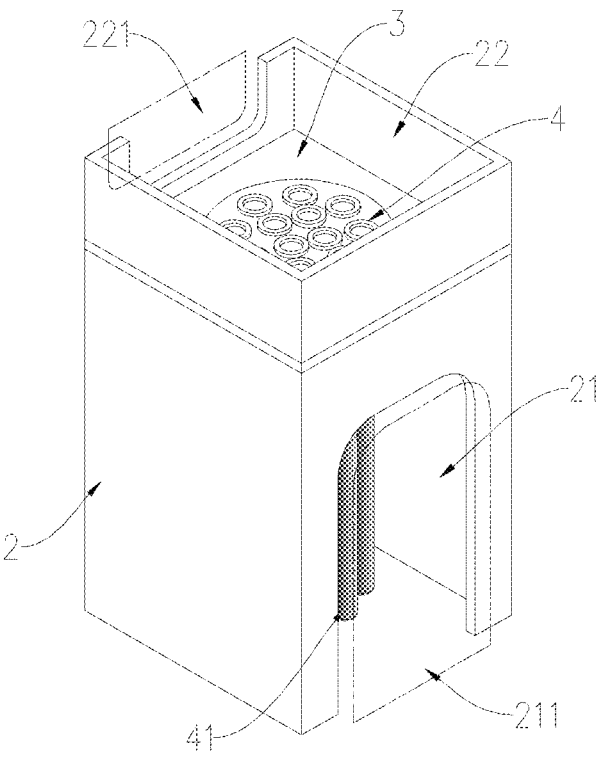
FIG. 3 is a third schematic structural diagram of the filter frame and filter in the high-temperature steam-water filtering unit according to the present invention.

The filter frame 2 is divided into an upper layer and a lower layer which are relatively independent by the interlayer 3, the side wall of the lower layer 21 is provided with a feed inlet 211 from bottom to top, and the side wall of the upper layer 22 is provided with a discharge port 221 from top to bottom; as shown in FIGS. 1 to 3, the feed inlet 211 and the discharge port 221 are not required to be disposed on the same side wall of the filter frame 2, but may be disposed on adjacent or opposite side walls, that is, the feed inlet 211 and the discharge port 221 may be disposed opposite to each other or may be disposed in a staggered manner.

Figure 4:
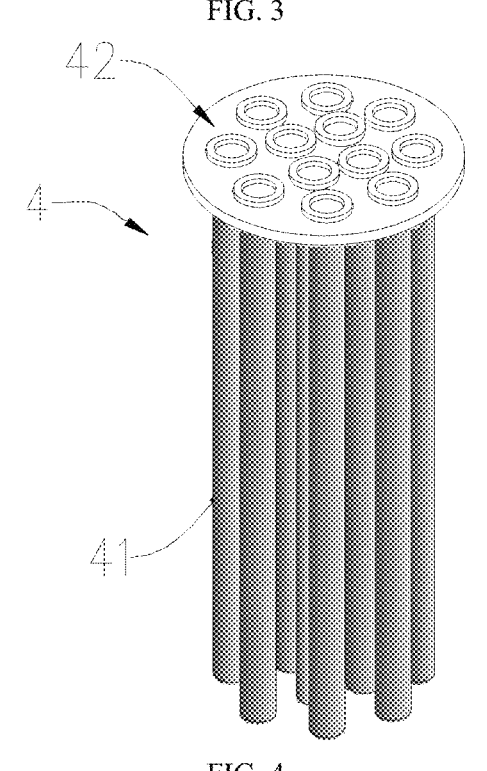
FIG. 4 is a perspective diagram of the filter according to the present invention.
Figure 5:
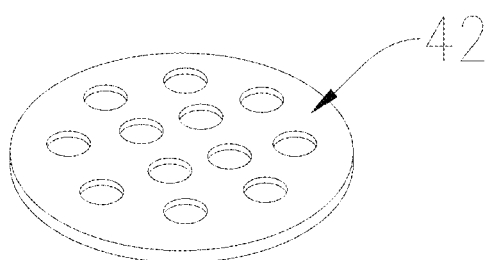
FIG. 5 is a schematic diagram of a flange bottom plate of the filter according to the present invention.
Figure 6:
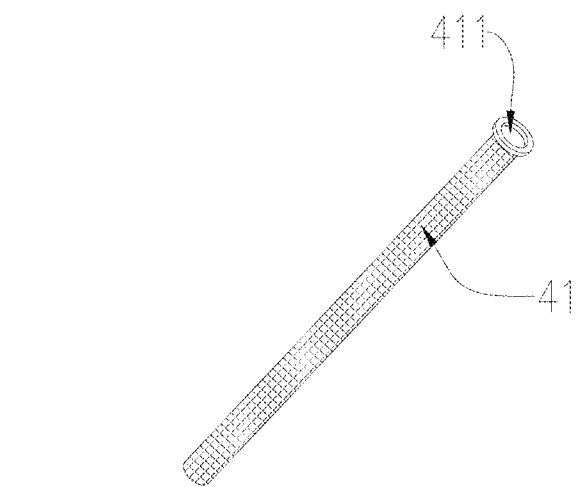
FIG. 6 is a schematic diagram of a filter cartridge of the filter according to the present invention.

As shown in FIGS. 4-6, the filter 4 comprises a flange bottom plate 42 fixedly mounted on a circular opening of the interlayer 3 by bolts, and a plurality of filter cartridges 41 vertically mounted on the flange bottom plate 42, wherein the plurality of filter cartridges 41 are arranged in parallel at intervals, outlets 411 of the filter cartridges 41 are located above the interlayer 3, the material of the filter cartridges 41 is made of micro-ceramic or stainless steel powder by sintering, the precision of the filter cartridges can be customized as required, and a plurality of inlets of the filter cartridges 41 are located on the side wall and are all located below the interlayer 3. The minimum filtration accuracy of the filter cartridges 41 is typically less than 0.1 μm, which can be selected based on filtration accuracy and grade.

Figure 7:
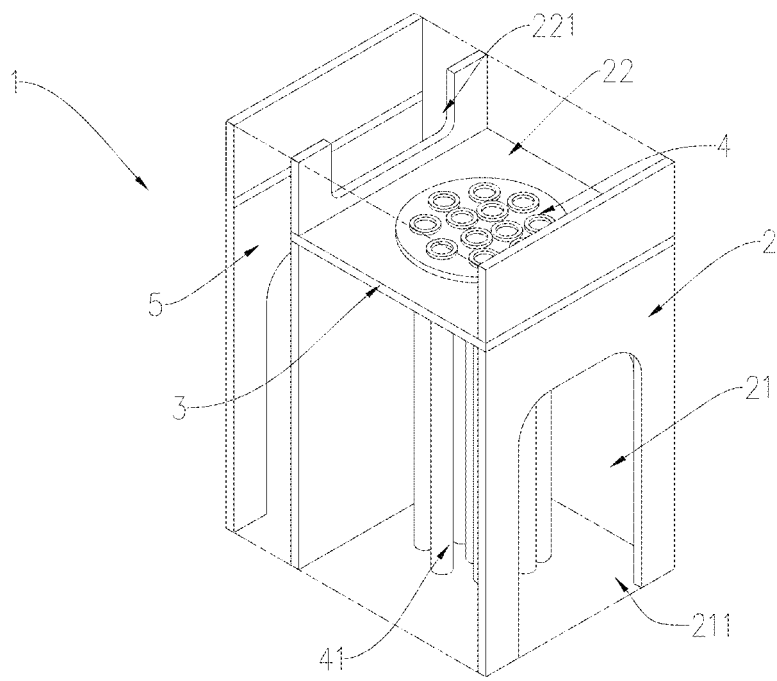
FIG. 7 is a perspective diagram of a high-temperature steam-water filtering unit according to the present invention.
Figure 8:
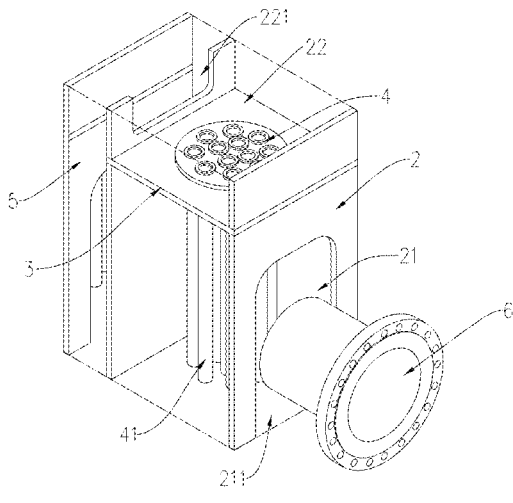
FIG. 8 is a perspective diagram of the high-temperature steam-water filtering unit and a steam inlet according to the present invention.
Figure 9:
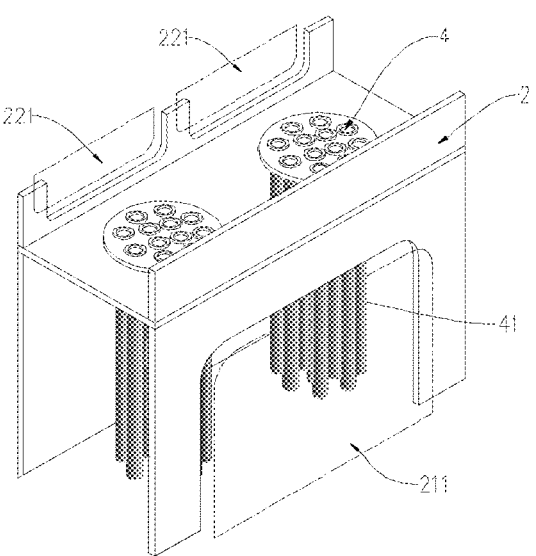
FIG. 9 is a schematic structural diagram of the filter frame and two of the filters in the high-temperature steam-water filtering unit according to the present invention.

As shown in FIG. 7, the communicating channel 5 is parallel to the filter frame 2, extends along the vertical height direction of the filter frame 2, and is a cavity structure, and the communicating channel 5 is in communication with the discharge port 221.

As shown in FIG. 6, the steam inlet 6 may be arranged on one side of the filtering unit to be in communication with the feed inlet 211, so that the steam enters the lower layer 21 of the filter frame 2 through the feed inlet 211, then passes through the filter cartridge 41 with its filtration action, enters the upper layer 22 of the filter frame 2 through the outlet 411 of the filter cartridge 41, and then enters the communicating channel 5 through the discharge port 221.

As shown in FIG. 7, two filters 4 may be arranged in parallel, that is, two filters 4 are mounted on the interlayer 3 of one filter frame 2, the spaces of the upper layer 22 of the interlayer 3 corresponding to the two filters 4 are communicated, and the spaces of the lower layer 21 of the interlayer 3 corresponding to the two filters 4 are also communicated, and at this time, the two filters 4 may share one feed inlet 211, and two discharge ports 221 are respectively arranged at positions corresponding to the two filters. in order to facilitate the cleaning of the filter frames 2, drain outlets 23 are arranged at the bottoms of the filter frames 2; in order to facilitate the maintenance and replacement of the filters 4, access manholes 24 with the same number as the filters 4 are formed in the filter frames 2.

Embodiment I

As shown in FIGS. 9-13, a combined high-temperature steam-water filtering device is shown, comprising two or more filtering units 1, in this embodiment, the number of the filtering units 1 is three, and the filtering units are arranged in series.

The filtering unit 1 comprises a filter frame 2, a filter 4 mounted on the filter frame 2, and a communicating channel 5, wherein the filter frame 2 is divided into an upper layer and a lower layer which are relatively independent by an interlayer 3, the side wall of the lower layer 21 is provided with a feed port 211 from bottom to top, and the side wall of the upper layer 22 is provided with a discharge port 221 from top to bottom, the feed inlet 211 and the discharge port 221 being arranged opposite to each other.

The structure of the filter 4 is the same as that described above and is not be repeated herein.

The communicating channel 5 is parallel to the filter frame 2, extends along the vertical height direction of the filter frame 2, and is a cavity structure, and the communicating channel 5 is in communication with the discharge port 221 and with the feed inlet of an adjacent filtering unit.

Figure 10:
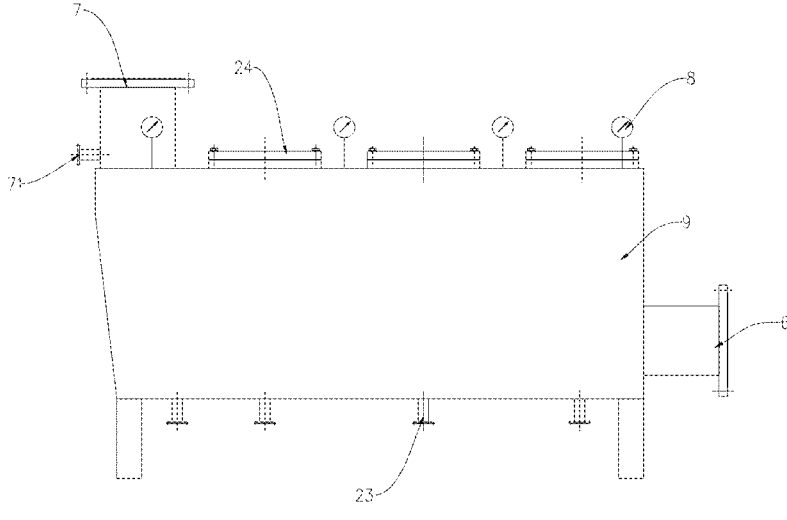
FIG. 10 is a front view of a combined high-temperature steam-water filtering device according to Embodiment I of the present invention.
Figure 11:
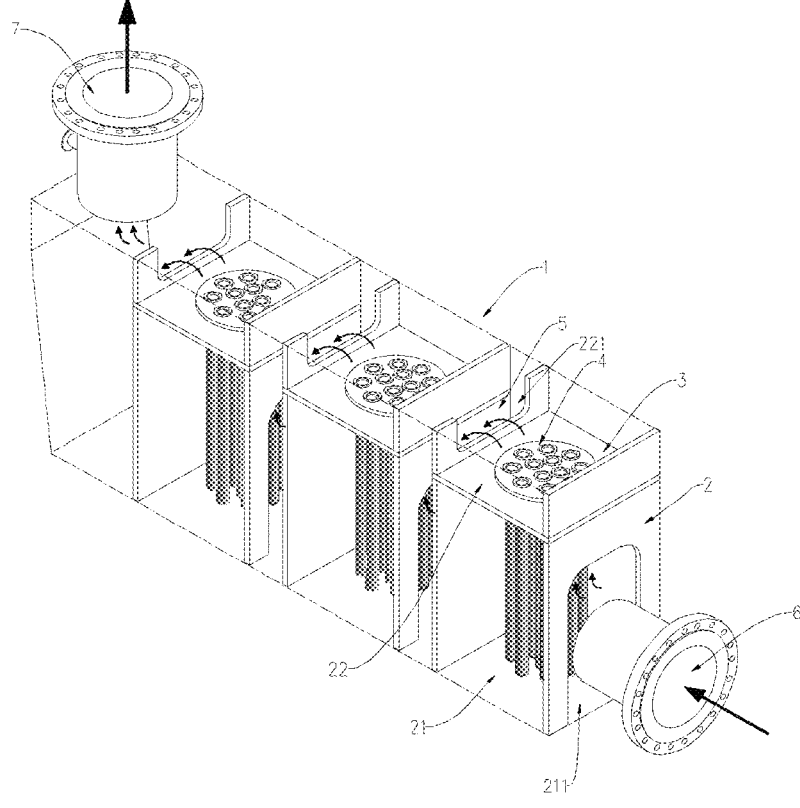
FIG. 11 is a perspective diagram of the combined high-temperature steam-water filtering device according to Embodiment I of the present invention.
Figure 12:
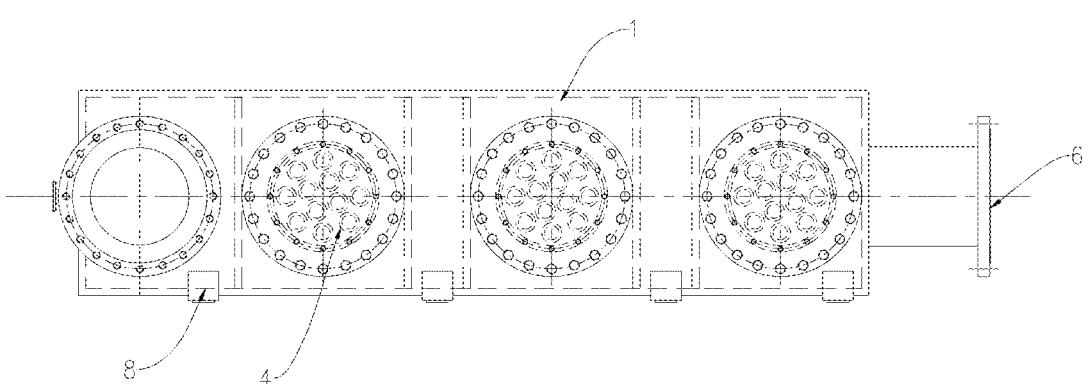
FIG. 12 is a top view of the combined high-temperature steam-water filtering device according to Embodiment I of the present invention.
Figure 13:
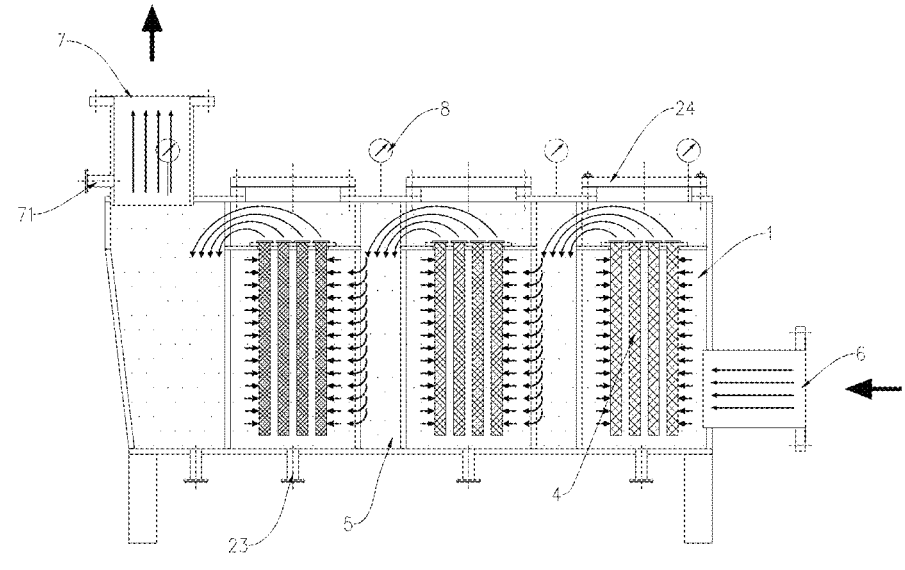
FIG. 13 is a schematic diagram showing the flow direction of the medium in the combined high-temperature steam-water filtering device according to Embodiment I of the present invention.

As shown in FIG. 10, the steam inlet 6 is arranged on one side of one filtering unit 1 to be in communication with the feed inlet 211; the steam outlet 7 is arranged at a top of the communicating channel 5 at a tail end, and may also, in other embodiments, be arranged directly at the discharge port of the filtering unit 1 at a tail end, being in communication therewith.

As shown by the arrows in FIG. 10, the steam enters the lower layer 21 of the filter frame 2 of the first filtering unit 1 from the steam inlet 6 after passing through the feed inlet 211, then passes through the filter cartridge 41 with its filtration action, enters the upper layer 22 of the filter frame 2 after passing through the outlet 411 of the filter cartridge 41, and then enters the communicating channel 5 after passing through the discharge port 221; then the steam enters an adjacent filtering unit from the communicating channel 5 after passing through the feed inlet of the adjacent filtering unit for filtering, with the filtration repeated for three times, and then is discharged from the steam outlet 7.

In order to conveniently find whether the filter cartridge 41 is blocked in time, a pressure sensor 8 is mounted between the feed inlet 211 and the discharge port 221 of each filtering unit 1 and is used for detecting and sending a signal to a control system at any time; when the filter cartridge 41 is blocked, the differential pressure between the feed inlet 211 and the discharge port 221 of each filtering unit 1 is increased, and when the differential pressure reaches a set value, the control system receives the signal and gives an alarm and terminates the operation of the equipment; the pressure sensor 8 is typically constituted by a pressure transmitter or an electric contact pressure gauge.

In order to facilitate transportation after assembly or to limit a plurality of filtering units 1, an outer shell 9 may be arranged around the plurality of filtering units 1 in a sleeving manner, and the shape of the outer shell 9 may be a cube or a cylinder, and the size of the outer shell is determined by the number and combination mode of the filtering units 1.

In order to facilitate the maintenance and replacement of the filters 4, access manholes 24 with the same number as the filters 4 are formed in the filter frame 2; the access manholes 24 are mounted, right above the filtering units 1, on the outer shell 9, and each filtering unit 1 is provided with one access manhole 24 for cleaning, replacing and maintaining. The filters 4 in the filtering units 1 can be taken out for replacement by opening the access manholes 24, and the filters 4 can also be directly washed by a water gun, and the washed sewage is discharged from the drain outlets 23.

Figure 14:
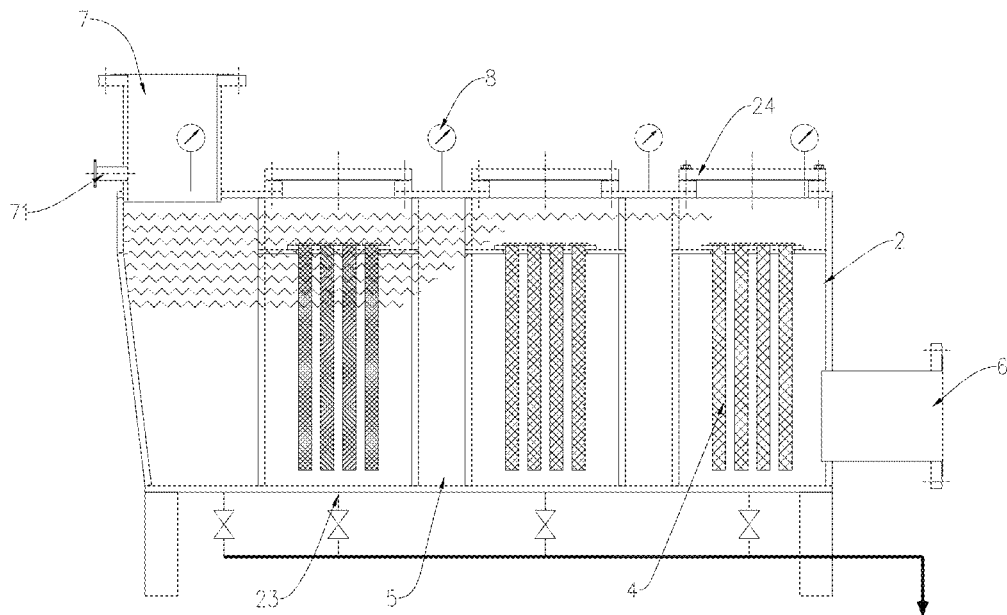
FIG. 14 is a schematic diagram showing the cleaning of the combined high-temperature steam-water filtering device according to Embodiment I of the present invention.

In order to facilitate the cleaning of the filter frames 2, as shown in FIG. 14, drain outlets 23 are arranged at the bottom of the filter frames 2, and a cleaning water inlet 71 is arranged at the steam outlet 7; the cleaning water inlet 71 and the drain outlets 23 are used for daily cleaning of water inlets and drain outlets after cleaning, when the filter cartridges 41 of the filters 4 are slightly blocked by water-soluble inorganic salts (differential pressure increases), clean water or desalted water enters from the cleaning water inlet 71 and is discharged from the drain outlets 23 after soaking and cleaning.

Embodiment II

Figure 15:
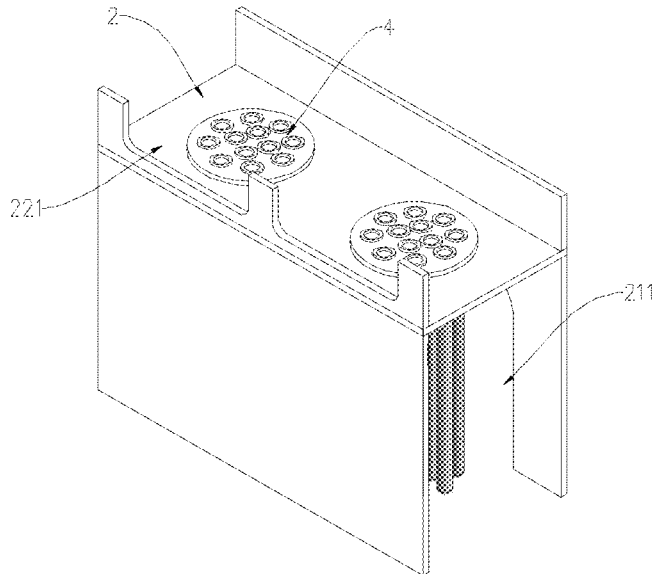
FIG. 15 is a schematic structural diagram of a filter frame and a filter in the combined high-temperature steam-water filtering device according to Embodiment II of the present invention.

As shown in FIG. 15, two filters 4 may be arranged in parallel, that is, two filters 4 are mounted on the interlayer 3 of one filter frame 2, and the arrangement direction of the two filters 4 is perpendicular to the medium flowing direction. In other embodiments, a plurality of filters 4 may be arranged on one filter frame 2; the spaces of the upper layer 22 of the interlayer 3 corresponding to the two filters 4 are communicated, and the spaces of the lower layer 21 of the interlayer 3 corresponding to the two filters 4 are also communicated, and at this time, the two filters 4 may share one feed inlet 211, and two discharge ports 221 are respectively arranged at positions corresponding to the two filters.

Figure 16:
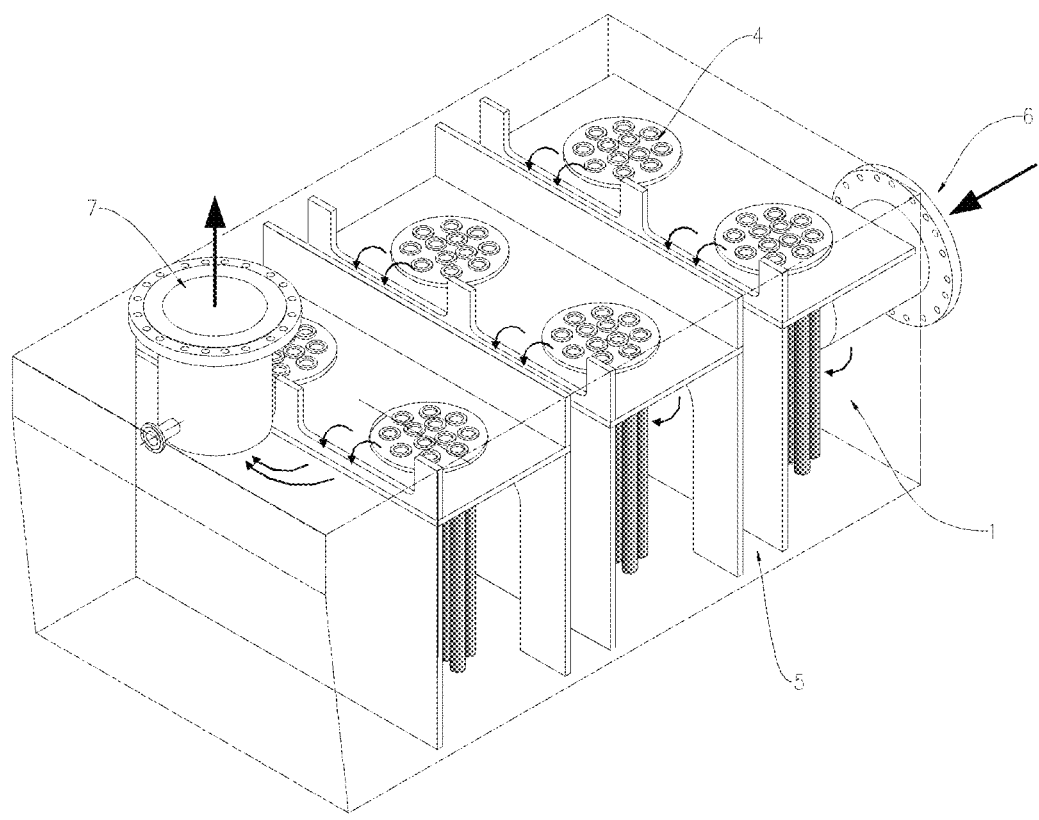
FIG. 16 is a perspective view showing an internal structure of the combined high-temperature steam-water filtering device according to Embodiment II of the present invention.
Figure 17:
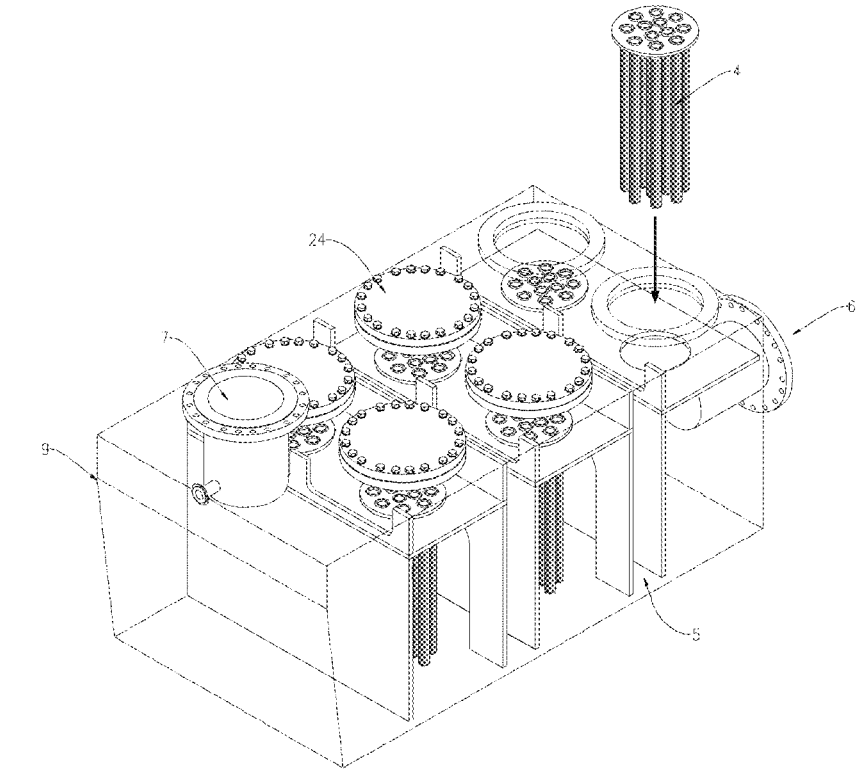
FIG. 17 is a schematic diagram showing the mounting of a filter of the combined high-temperature steam-water filtering device according to Embodiment II of the present invention.
Figure 18:
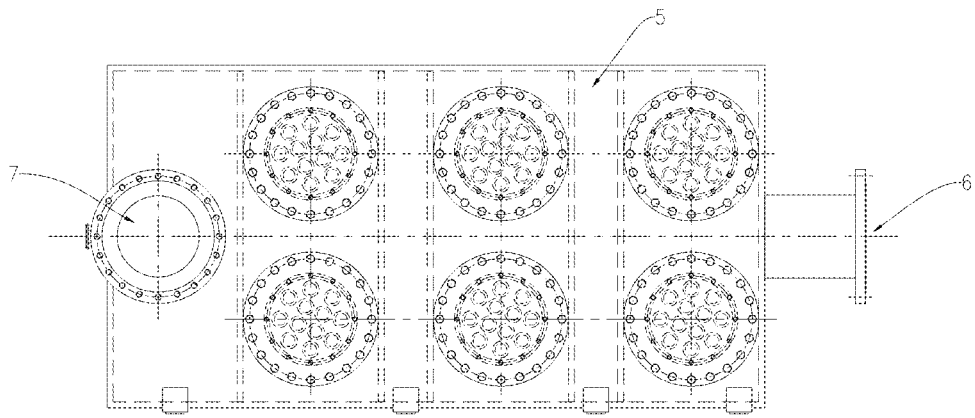
FIG. 18 is a top view of the combined high-temperature steam-water filtering device according to Embodiment II of the present invention.

As shown in FIGS. 16-18, one filtering unit 1 has two filters 4 arranged in parallel, and then a plurality of filtering units are arranged in series, the steam inlet 6 is located between the two filters of the first filtering unit and is in communication with the feed inlet 211, and the steam outlet 7 is located in the middle of the communicating channel of the filtering unit at a tail end and is in communication with the discharge port 221 of the filters at a tail end.

Embodiment II is different from Embodiment I in that two filters are connected in parallel to one filtering unit, and other structures are the same, which are not repeated herein.

Embodiment III

Figure 19:
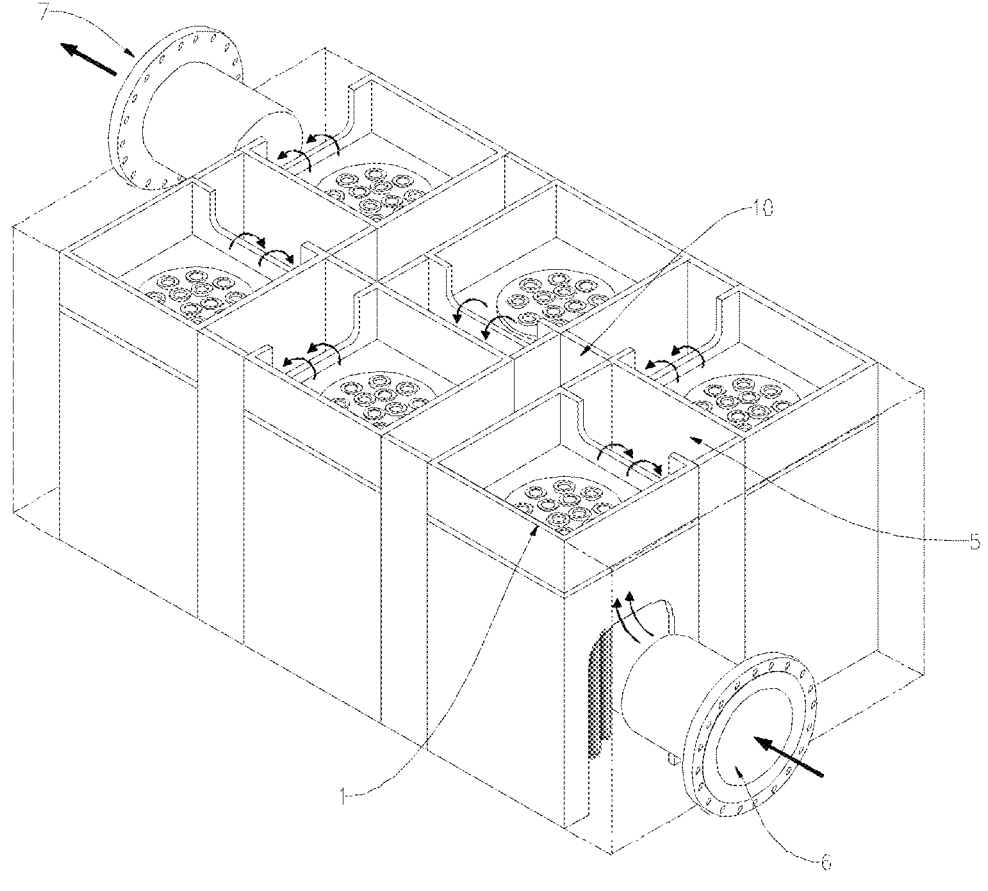
FIG. 19 is a perspective view of the combined high-temperature steam-water filtering device according to Embodiment III of the present invention.

As shown in FIG. 19, the present embodiment is different from Embodiment I in that the feed inlet 211 and the discharge port 221 of the filtering unit 1 are arranged in a staggered manner, that is, the feed inlet 211 and the discharge port 221 are arranged on two adjacent side walls of the filter frame 2. The communicating channels 5 are separated by baffles 10, and the baffles 10 and the side walls of the adjacent filtering units 1 which are not in communication with the feed inlets and the discharge ports form closed surfaces by extending along the whole vertical height direction. That is, the remaining adjacent filtering units are separated, and at this time, curved and undulating flow channels in the direction of the arrows are formed.

Embodiment III is different from Embodiment I in that the adjacent filtering units are arranged in a bent manner, rather than in a straight line, and other structures are the same, which are not repeated herein.

The above-mentioned embodiments are used to illustrate the present invention, but not to limit the present invention. Any modifications and changes made to the present invention within the spirit of the present invention and the protection scope of the claims fall within the protection scope of the present invention.

The invention claimed is:

1. A combined high-temperature steam-water filtering device, comprising:

two or more filtering units arranged in an outer shell, wherein each filtering unit comprises a filter frame divided into an upper layer and a lower layer by an interlayer, the lower layer being provided with a feed inlet capable of being in communication with a steam inlet, and the upper layer being provided with a discharge port;

a filter comprising a plurality of filter cartridges mounted on the interlayer along a vertical direction, an inlet of each filter cartridge being positioned below the interlayer, and an outlet of each filter cartridge being positioned above the interlayer; and a communicating channel extending along a vertical height direction of the filter frame and being in communication with the discharge port and the feed inlet of the adjacent filtering units, wherein the interlayer is provided with two or more of the filters, the two or more of the filters being arranged along a direction perpendicular to a medium flowing direction, and wherein the feed inlet and the discharge port of each filtering unit are oppositely arranged; or the feed inlet and the discharge port of each filtering unit are arranged in a staggered manner.

2. The combined high temperature steam water filtering device according to claim 1, wherein the discharge port of the filtering unit at a tail end is in communication with a steam outlet; or the steam outlet is arranged at a top of the communicating channel at a tail end.

3. The combined high temperature steam water filtering device according to claim 1, wherein the filtering unit also comprises a pressure sensor for monitoring a differential pressure between the feed inlet and the discharge port.

4. The combined high temperature steam water filtering device according to claim 1, wherein a drain outlet is arranged at the bottom of the filter frame; access manholes with a same number as the filters are formed in the filter frame; the filter comprises a flange bottom plate, and the filter cartridges are mounted on the flange bottom plate in parallel.

* * * * *